UNITED STATES PATENT OFFICE.

HENRY A. GARDNER, OF WASHINGTON, DISTRICT OF COLUMBIA.

DRYING COMPOSITION AND PROCESS OF MAKING SAME.

1,412,399. Specification of Letters Patent. Patented Apr. 11, 1922.

No Drawing. Application filed November 30, 1920. Serial No. 427,442.

*To all whom it may concern:*

Be it known that I, HENRY A. GARDNER, a citizen of the United States of America, residing at Washington, in the District of Columbia, have invented certain new and useful Improvements in Drying Compositions and Processes of Making Same, of which the following is a specification.

The present invention comprises a novel process involving a reaction between an organic acid or organic body having acid properties, and an unsaturated organic body resulting from the partial or complete splitting off of hydrochloric acid from chlorinated bodies, and particularly chlorinated hydrocarbons. The invention comprises also the products resulting from the practice of the said process.

It is now known that hydrocarbon bodies such as mineral oils may by successive chlorination and dechlorination, the latter process involving the splitting off of hydrochloric acid, be transformed into non-saturated bodies which possess drying properties and are susceptible of a wide variety of uses in the paint, varnish, plastic and other arts. Compare for example application Serial No. 343,458, filed Dec. 9, 1919, Gardner and Bielouss; Serial No. 393,091, filed June 30, 1920, H. A. Gardner; and Serial No. 397,872, filed July 21, 1920, E. Bielouss.

The hydrocarbons which are susceptible to this treatment embrace a considerable range of bodies, including the mineral oils of the paraffin and aromatic types, and such complexes as the terpenes, including turpentine. Also the process may be applied to certain glycerides, such for example as soya bean oil and tung oil, producing therefrom unsaturated bodies having drying properties as described in the copending application of H. A. Gardner, Serial No. 407,226, filed August 31, 1920. For convenience, the unsaturated bodies resulting from the dechlorinating operation will be hereinafter referred to simply as dechlorinated oils.

I have discovered that the dechlorinated oils are capable of uniting with organic acids or acid organic bodies of high boiling point, and of yielding therewith products which are of relatively low acidity or even substantially neutral; and that these products likewise possess strongly marked drying properties, usually in fact drying more rapidly than the dechlorinated oils from which they are formed, and in many instances possessing superior film forming qualities. The nature of the reaction is not as yet fully understood, but it may be regarded as of the esterification type. The acid organic bodies which I prefer to subject to partial or complete neutralization by this treatment are the acid resins, and especially rosin. However my invention is not restricted to this particular class of materials, since somewhat similar results are obtainable with acid materials of very different type, including for example the acids derived from linseed, tung or other vegetable oils.

The neutralization or partial neutralization of the acid organic body by the dechlorinated oil may be accomplished by simple heating under either of two general conditions, to wit:

(1) The acid organic body may be mixed with or dissolved in the chlorinated oil, and the latter then subjected to dechlorination by heating, either in presence or absence of a catalyzer, and either in presence or absence of a diluent, such as mineral spirits or the like. The dechlorination may be carried out in any of the ways described in the prior applications mentioned above. However, since some moisture may be formed or set free in the course of the reaction, it is desirable to use enameled or other reactors which are not attacked by moist hydrochloric acid gas.

(2) The acid organic body may be added directly to the dechlorinated oil and heated therewith until the acid number is sufficiently reduced, indicating the accomplishment of the esterification. This may be accomplished by heating at comparatively high temperatures, say around 250° C. for 5–7 hours, or by correspondingly longer heating at lower temperatures. If desired a small proportion of litharge or of a mixture of litharge and umber, or other suitable accelerant or drying agent, may be added in connection with either esterification method in order to hasten the reaction or to improve the drying qualities of the product.

As a modification of these methods, the acid organic body may be introduced into the chlorinated oil at any stage of the dechlorinating operation.

The proportion of acid organic body to the dechlorinated hydrocarbon may be varied over extremely wide limits while securing the desired drying qualities in the product. For most purposes it will suffice to employ 5-25 parts by weight of rosin to each 100 parts of the chlorinated oil: but I have successfully used as much as 260 parts of rosin per 100 parts of chlorinated oil, the products throughout the entire range indicated being liquid, and when properly applied yielding quick drying and satisfactory paint and varnish films.

When the products are to be used as paint vehicles they may be thinned if necessary to proper consistence by the addition of 10-20% of suitable thinners, such as mineral spirits etc. I prefer to add also about the same proportion of treated China wood or tung oil, for as more particularly pointed out in my copending application Serial No. 388,913, filed June 14, 1920, the dechlorinated oils exert a marked effect upon the polymerization of tung oil when mixed or componded therewith, not only accelerating the polymerization or setting of the product, but causing this action to take place at decidedly lower temperatures, or even at normal temperatures. Any of the usual driers may be employed, but their use is not regarded as essential.

Hydrocarbons which have been highly chlorinated sometimes exhibit on dechlorination a tendency to gelatinize or solidify probably by polymerization. I have further observed that the addition of rosin and its equivalents to such chlorinated hydrocarbons serves entirely to prevent this gelatinization. For example, in one instance, a hydrocarbon of the paraffin type which had absorbed approximately 72% by weight of chlorin, and which solidified when heated to the temperature necessary for dechlorination, was readily and substantially completely dechlorinated and yielded rapidly-drying liquid products, after receiving as an addition 25% by weight of rosin. Increasing proportions of rosin up to 260% by weight yielded quick-drying liquid products of the same general type.

Following are certain specific examples illustrative of the invention, it being clearly understood that the invention is not restricted to the use of the particular substances or manipulations therein mentioned:

Example I.

100 parts by weight of a paraffin type hydrocarbon oil free from low boiling components and containing 31% of chlorin received an addition of 260 parts of rosin (acid value 158). The resulting mixture had an organic acid value of approximately 108. After heating for three hours at 320° C. the resulting mass was viscous and had an acid value of 13.4. Heating for one more hour at a temperature of 320° C. yielded a product having an acid value of only 4.4. The fluidity of the product tended to increase with the duration of the heating.

Example II.

100 parts of a similar oil containing 32% of chlorin was heated with 80 parts of rosin. The initial acid value of the mixture was 87. After heating for one hour at 260° C. it became resinous and stringy and had an acid value of approximately 40. After heating for another hour up to 325° C. it became viscous but fluid, with an acid value of only 5.6.

Example III.

85 parts of similar oil containing 31% of chlorin were heated for four hours up to 320° C. with 204 parts of fatty acids derived from linseed oil. The acid value of the mixture decreased in this time from 139 to 93.

Example IV.

100 parts by weight of turpentine which had been previously chlorinated to the extent of 54% by weight of chlorin was heated with 250 parts of rosin for a period of one and one-half hours at a temperature of 250° C.; then for a further period of one-half hour to 300° C., and for a further period of one hour up to 320° C. The product was a dark colored, viscous mass, nearly free from chlorin, having an acid value of 14.4 and excellent drying properties.

Example V.

700 parts by weight of a paraffin type hydrocarbon oil containing 32% of chlorin was mixed with 50 parts of rosin, 10 parts of combined litharge and umber, and 20 parts of iron powder. The mixture was heated for eight hours to 250° C. at which time it was found to be dechlorinated to the extent of 90% and to have an iodine number of 107. When this product was mixed with 50% of red oxid of iron and 5% of commercial drier, the film dried in six hours when exposed to sunlight.

Example VI.

A hydrocarbon oil similar to the foregoing but which had been subjected to the dechlorinating process was mixed with 10% by weight of rosin, the mixture having an acid number of approximately 16. Seven hours heating to approximately 240° C. reduced the acid number to less than 2. The resulting product mixed with an appropriate quantity of thinner and pigment yielded satisfactory drying films.

I claim:—

1. Process of preparing compositions having drying properties, comprising effecting partial or complete neutralization of an acid organic body by reacting thereon with a dechlorinated oil.

2. Process of preparing compositions having drying properties, comprising effecting partial or complete neutralization of an acid organic body by reacting thereon with a dechlorinated hydrocarbon.

3. Process of preparing compositions having drying properties, comprising effecting partial or complete neutralization of an acid resin by reacting thereon with a dechlorinated oil.

4. Process according to claim 1 in which the dechlorination is effected wholly or in part in presence of the acid organic body.

5. The herein described products having drying properties, said products resulting from the partial or substantially complete neutralization of an acid organic body by a dechlorinated oil.

6. The herein described products having drying properties, said products resulting from the partial or substantially complete neutralization of an acid organic body by a dechlorinated hydrocarbon.

7. The herein described products having drying properties, said products resulting from the partial or substantially complete neutralization of an acid resin by a dechlorinated oil.

8. The herein described products having drying properties, said products resulting from the partial or substantially complete neutralization of an acid resin by a dechlorinated hydrocarbon.

9. The herein described products having drying properties, said products resulting from the partial or substantially complete neutralization of an acid resin by a dechlorinated hydrocarbon, and containing also a glyceride.

10. The herein described products having drying properties, said products resulting from the partial or substantially complete neutralization of an acid resin by a dechlorinated hydrocarbon, and containing also tung oil.

In testimony whereof, I affix my signature.

HENRY A. GARDNER.